Aug. 17, 1954   C. A. SAMUEL   2,686,403
FLEXIBLE SEALING MEMBER FOR FLUID ACTUATED MOTORS
Filed March 15, 1949
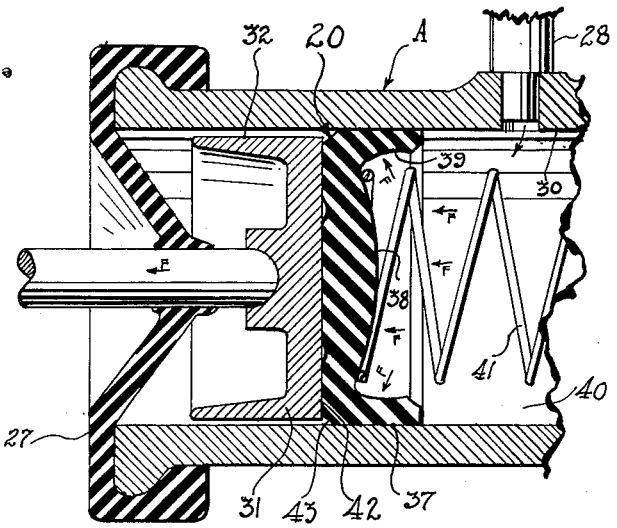
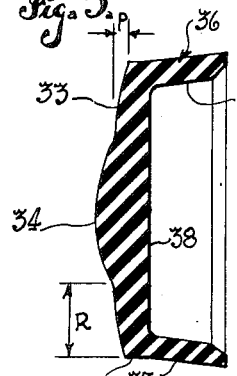
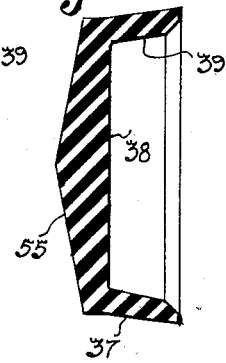
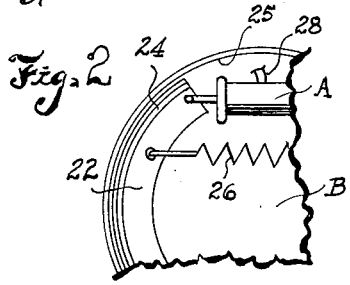
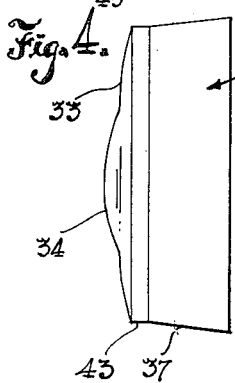
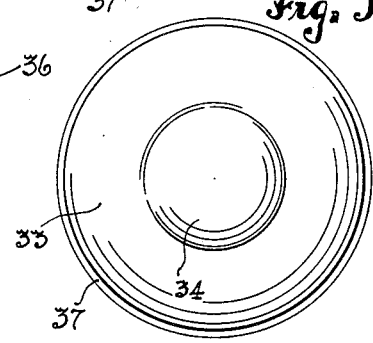
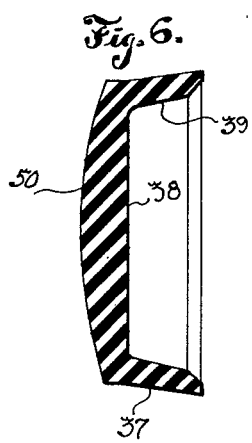
INVENTOR:
Charles A. Samuel
BY: Joseph M. Gartner, ATTY.

Patented Aug. 17, 1954

2,686,403

UNITED STATES PATENT OFFICE 2,686,403

FLEXIBLE SEALING MEMBER FOR FLUID ACTUATED MOTORS

Charles A. Samuel, Forest Park, Ill.

Application March 15, 1949, Serial No. 81,484

2 Claims. (Cl. 60—54.6)

This invention relates in general to fluid actuated motors and is more particularly concerned with piston assemblies arranged for employment in wheel cylinders for a hydraulic brake system.

The subject matter of this invention is related to that disclosed in my co-pending patent applications, Serial No. 68,490, filed December 31, 1948, entitled "Hydraulic Brake Wheel Cylinder Piston"; Serial No. 763,464, filed July 25, 1947, now Patent No. 2,598,609, entitled "Hydraulic Cylinder Piston".

Heretofore, brake mechanisms of this general class consisted of a hydraulic cylinder operatively associated with the brake bands and having suitable pistons operatively disposed therein and operable upon actuation of a conventional brake pedal through a hydraulic master cylinder. The piston assembly incorporated in the prior art brake mechanisms comprise a washer formed of a flexible material such as, for example, rubber and said washer usually is disposed in contact with a metallic piston having portions thereof in engagement with end portions of a brake band. In such prior art constructions it has been found that the washers are subject to premature wear and begin to leak after a relatively short period of operation, thereby causing an uneven application of the brakes which will cause the automotive vehicle to swerve from side to side when the brakes are applied.

It is recognized that in the prior art numerous attempts have been made to provide a suitable piston and flexible sealing member for fluid actuated motors of this general class and efforts have been made to overcome the various deficiencies found in such prior art constructions, but to the best of the applicant's knowledge the prior art structures have had only limited success, and have been accorded only limited commercial recognition. It is believed that this fact results from deficiencies of the prior art structures, their non-adaptability to become a replacement of the conventional piston assemblies for present fluid actuated motors without modification or alteration thereof and their expensive construction which so greatly increased the cost as to seriously handicap sales acceptance.

The present improvement in flexible sealing members for fluid actuated motors is directed to simplify their construction and their mode of operation, and also to provide a flexible sealing member which may be readily employed as a replacement of the old conventional type sealing member without necessitating alteration or modification of the present conventional fluid actuated motor cylinders. Moreover, the present device seeks to employ conventional parts wherever necessary and possible, thereby to effect a reduction in the cost over the prevailing types of piston assemblies presently employed.

Accordingly, an object and accomplishment of the invention is to provide a piston assembly including an especially designed flexible sealing member for fluid actuated motors, the construction of which is particularly characterized as employing principles which will prolong the life and term of operation of such piston assemblies.

It is a particular object and accomplishment of the invention to provide for fluid actuated motors a piston assembly including an especially designed sealing member which may be readily employed in the conventional cylinders to replace the conventional type piston assemblies without necessity of alteration of modification of the cylinder or other parts of the fluid actuated motor.

Another object and accomplishment of the invention is to provide an improved piston assembly including an especially designed flexible sealing member for fluid actuated motors by co-relating and especially designing the various elements of such piston assemblies, whereby there shall be such cooperation between said improved elements as will best serve the purpose of providing an efficient fluid actuated motor incorporating therein a piston assembly capable of being manufactured at low cost and yet giving the maximum of satisfactory service in use.

A further object and accomplishment of the invention is to provide an improved piston assembly for fluid actuated motors designed for advantageous employment in wheel cylinders of hydraulic brake systems and which shall have a novel and compact arrangement of parts wherein said parts can be readily assembled and serviced.

A more detailed object of the invention is to provide a piston assembly particularly characterized by its arrangement and design of parts to effect a sealed and locked arrangement within the cylinder which is followed by a diaphragm action of the especially designed sealing member reflectible upon the piston to cause movement of the piston a predetermined distance axially in the cylinder to perform work, said diaphragm being followed by a further possible action wherein the piston assembly is self-adjusting when it is necessary to move the piston to a new position due to wear of the brake bands whereupon the sealing member of the subject piston assembly will become unlocked and move axially in the cylinder to assume a new position whereupon the sealed and locked arrangement and the diaphragm action is repeated.

The invention seeks, as a further object and accomplishment, to provide a piston assembly including a sealing member as contemplated herein and characterized by an arrangement of parts to more advantageously and satisfactorily perform the function required of it and adapted to provide a compact unit which will successfully combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of the invention and to practice the same in substantially the manner as hereinafter more fully described and, more particularly pointed out in the appended claims.

With these objects in view, together with others which will appear as the description proceeds, the invention resides in the novel construction and cooperative function of the parts thereof, the combinations of parts and the arrangement thereof as illustrated in the drawing and which will be more fully described hereinafter and particularly pointed out in the claims.

In the accompanying drawing on which there is shown various embodiments of the invention, Fig. 1 is a sectional elevational view of a piston assembly operatively disposed in a hydraulic cylinder and disclosing an especially designed flexible sealing member embodying the features of this invention;

Fig. 2 is an elevational view of a hydraulic brake assembly illustrating the disposition of the various parts of the brake assembly contemplated herein;

Fig. 3 is a sectional view of the flexible sealing member illustrating the sealing member when not disposed in the cylinder of the brake system;

Fig. 4 is a side elevational view of the flexible sealing member depicted in Fig. 3 and illustrating the sealing member when not disposed in the cylinder of the brake system;

Fig. 5 is a front elevational view of the flexible sealing member depicted in Fig. 4;

Fig. 6 is a sectional view of a modified form of sealing member embodying the features of the invention; and Fig. 7 is a sectional view of a modified form of sealing member embodying the features of the invention.

The drawing is to be understood as being more or less of a schematic character for the purpose of illustrating and disclosing typical or preferred forms of the improvements contemplated herein and in the drawing like reference characters identify the same parts in the several views.

As one possible example of advantageous employment of the contemplated piston assembly, reference is made to the drawing wherein there is illustrated the piston assembly including the especially designed sealing member with which the invention is particularly concerned and designated in its entirety by the numeral 20 as being operatively associated with a conventional hydraulic cylinder designated in its entirety by the letter A, said hydraulic cylinder being adjunctively employed, for example, to a conventional wheel brake assembly designated in its entirety by the letter B, the said conventional brake mechanism being adaptable for advantageous employment in a conventional automotive vehicle (not shown).

The illustrated brake mechanism (Fig. 2) may comprise conventional brake bands as at 22 having secured thereto by any approved practice, friction facing material 24, said friction facing material being arranged to engage a suitable drum 25 upon operation of the device.

In order to urge the brake bands 22 to their normally inoperative position there is provided a conventional spring 26 illustrated as being operatively associated with the brake bands in a manner to draw the brake bands away from the drum a predetermined distance, thereby to disengage the friction facings 24 from the brake drum 25 when the brake mechanism is in released position.

The illustrated brake mechanism may comprise, in general, a hydraulic cylinder A operatively associated with the brake bands 22 and having incorporated therein the contemplated improved piston and flexible sealing member construction 20 with which the present invention is particularly concerned, said piston having portions thereof in engagement with end portions of the brake bands 22, and said hydraulic cylinder being provided with removable end caps 27 formed of a flexible material such as, for example, rubber, and arranged to prevent oil, dirt or other foreign matter from entering the interior of the cylinder A.

To cause the brake bands 24 to engage the drum 25 there is provided a hydraulic cylinder A, said hydraulic cylinder being provided with suitable conduits 28 adaptable to connect the same with a conventional hydraulic master cylinder (not shown), which in turn is operatively associated with the brake pedal (not shown) of a conventional automotive vehicle.

Suffice it to say, since the invention is not particularly concerned with the precise construction of the illustrated brake mechanism and/or the general construction of the wheel brakes of an automotive vehicle and/or their associated parts, they will not be further described in detail, and it is deemed sufficient for all intentions and purposes herein contained to show only portions thereof adjacent to and cooperating with the piston and flexible sealing member construction 20 contemplated herein. It is to be understood that details of construction of such wheel brake mechanism and/or their associated parts may be modified to suit particular conditions or to satisfy the engineering genius of various competitive manufacturers and in some instances the flexible sealing member contemplated herein may be advantageously employed in other types of hydraulic cylinders, and I do not wish to be limited to the construction of these elements as set forth, except where such construction particularly concerns the invention contemplated herein.

Having thus described, by way of example, a possible adaptation of the piston and flexible sealing member construction 20 as contemplated herein and having described the general environment surrounding the adaptation, the specific construction and cooperating functions of the parts of said piston and flexible sealing member construction 20 with which the present invention is particularly concerned, will now be described in detail.

In the exemplary embodiment of the invention depicted in Fig. 1, the piston structure including the flexible cup sealing member 20 with which the present invention is particularly concerned is shown operatively disposed in the internal bore 30 of a conventional hydraulic cylinder A and comprises in general, a piston body 31 illustrated in Fig. 1 and formed of a suitable metal, preferably an aluminum alloy or brass, to define a generally cup-like shape and having a side surface 32 normally in free sliding engagement with the internal bore 30 of the cylinder A, and a flexible sealing member 36 formed of rubber, or any other material having characteristics similar to those of rubber to define an annular cup-shape having a convex surface 33 with an axially projecting protuberance 34 centrally located thereon and arranged so as to be in intimate contact with and operatively associated with the piston body 31 as shown in Fig. 1 in a manner so that the convex surface 33 and the protuberance 34 of the sealing member 36 may cooperate to perform the various functions intended which will be hereinafter fully described, said piston body and sealing member being so arranged and being particularly characterized in their combined mode of cooperative action through a first phase of operation wherein the reaction of the convex surface and the protuberance of the flexible sealing member upon the substantially flat confronting surface of the piston body coacting with the pressures exerted in opposed direction upon the piston body and the flexible sealing member will produce a more effective seal and a locked relation of the peripheral surface 37 of the flexible sealing member with the bore 30 of the cylinder.

The first phase of operation is followed by a second phase of operation wherein a diaphragm action is imparted by the central portions of the flexible sealing member so that when the fluid pressure is applied to the face 38 of the flexible sealing member, the force will be reflected upon the piston body in the direction of the arrows marked F (Fig. 1) and upon the internal surface 39 of the flexible sealing member thus to maintain the seal and locked relationship of the periphery of the sealing member with the internal bore 30 of the cylinder and to cause the movement of the piston body axially in the cylinder a normal predetermined distance to perform work while the sealing member is in the sealed and locked relationship hereinbefore described.

Particular attention should be given to the third phase of operation which follows the second phase of operation, wherein the flexible sealing member and the piston body are arranged to coact to readjustment when the piston assembly is caused to move axially in the cylinder beyond the normal predetermined distance whereupon the peripheral edge 37 of the flexible sealing member will be caused to unlock itself from the internal bore 30 of the cylinder and follow the axial movement of the piston body to assume a new position whereupon the sealing and locked relationship and the diaphragm action may be repeated.

It is notable that the third phase of operation is particularly effective for readjustment of the piston assembly required by wear of the brake bands or because of various thicknesses of the brake bands. In this connection, it may be stated that when brake bands are replaced the piston assembly of the present invention will readily and advantageously compensate for differences in the thickness of the bands without requiring elaborate adjustment devices presently described in the prior art structures.

Particular attention is directed to the fact that when the brake fluid is normally disposed in the chamber 40 of the cylinder A a normal static pressure of approximately six pounds is exerted upon the face 38 and upon the internal surface 39 of the flexible sealing member. In addition to this static pressure there is a normal atmospheric pressure of two pounds coupled with a spring as at 41 arranged to exert approximately seven pounds pressure bringing a total of approximately fifteen pounds exertable against the face 38 and the internal surface 39 of the flexible sealing member to cause the flexible member to assume its operative position in confronting relationship with the piston body, the relative disposition of the elements being exemplified, in this condition, as illustrated in Fig. 1. A force exemplified by the spring 26 of approximately fifty pounds is exerted against the piston body member in the opposite direction thereby to cooperate with the fluid pressure to properly position the piston and the flexible sealing member in sealing and locked arrangement with the internal bore 30 of the cylinder.

Upon application of the brakes the fluid pressure in the chamber 40 is increased to a degree to overcome the pressure exerted upon the piston by the spring 26, thereby causing central portions of the flexible sealing member to impart a diaphragm action which, coupled with the fluid pressure exerted upon the face 38, will cause the piston to move axially in the cylinder a predetermined distance ranging from .006 to .030 of an inch to apply the bands into engagement with the drum.

In general, the sealing and locked arrangement of the peripheral edge 37 of the flexible sealing member with the internal bore 30 of the cylinder is accomplished by the reaction of the generally convex surface 33 and the protuberance 34 of the flexible sealing member upon the normally flat confronting surface 42 of the piston body whereupon the movement of the piston body in a direction inwardly of the cylinder bore will cause the convex surface 33 of the flexible sealing member to assume the position as shown in Fig. 1 which will cause the portion of the periphery 43 of the flexible sealing member adjacent the piston body to move very slightly radially inwardly as shown in Fig. 1 and the portion of the periphery 37 removed from the annular portion 32 of the piston to move radially outwardly to thus produce the sealed and locked relation of the peripheral edge 37 with the internal bore 30 of the cylinder which action is then followed by a diaphragm action in the central portions of the flexible sealing member which diaphragm action is reflectible upon the piston to assist movement of the piston axially in the cylinder to perform work.

It can be seen that axial movement of the piston body to the left as shown in Fig. 1 will tend to cause the flexible sealing member to assume its normal position, that is to say, the surface 33 and protuberance 34 will tend to straighten itself to assume substantially its natural contour as shown in Fig. 3. Thus, it can be seen that the radial distance will increase thereby even more effectively causing the sealed and locked relationship of the periphery of the sealing member with the internal bore 30 of the cylinder. The radial outward movement of portions of the flexible sealing member coupled with the fluid pressure exerted upon the internal surface 39 will even more effectively provide the seal and locked relationship hereinbefore described.

It is very important to understand that only very slight movement of the piston body, in some cases approximately .006 to .030 of an inch, is all that is required to cause the brake bands to engage the drum. In the event that axial movement of the piston body greater than .006 to .030 of an inch is desired due to wear of the brake bands, the third phase of operation hereinbefore described will become effective to move the flexible sealing member axially in the cylinder to a new position to become again locked in position whereupon the first and second phases of operation are repeated. Thus, it is apparent that the flexible sealing member will only move axially in the cylinder a very few times, say, once after every 3,000 to 4,000 miles traveled, which naturally will eliminate the heretofore objectionable wear of the peripheral edges of the flexible member.

It is important to understand that the coaction of the various elements of the present piston assembly in imparting a locked and sealed arrangement and thereafter imparting a diaphragm action to move the piston to do work is distinguishable from the conventional flat faced piston and sealing means which in each operation imparts a "scuffing action," that is to say, both elements reciprocate and move in each direction of the device thus causing undue wear to the peripheral edge 37 of the sealing member.

Moreover, the coaction of the various elements of the present invention is also clearly distinguishable from the prior art diaphragm constructions in that each of such prior art structures provide for the peripheral edge of the sealing member to be fixedly secured to the cylinder while the present piston assembly provides for the peripheral edge to be sealed and locked only under certain conditions and, more important, the present assembly may be employed in present conventional cylinders without alteration or modification thereof.

In accordance with the construction of the present invention the sealing member is effectively locked in position and no scuffing action is found because after the flexible sealing member is locked in its operative position, the diaphragm action of the central portions thereof coupled with fluid pressure upon the face 38 of the flexible sealing member will cause the desired movement of the piston body 31 axially in the cylinder to perform work. It has been found that the life of the flexible sealing member is substantially increased due to the combination of the non-scuffing action and the flexing of the rubber during each operation. The flexing of the rubber in each diaphragm action has been found to substantially increase the life of the flexible sealing means. In this connection, exhaustive experiments have proven that the life of the flexible sealing member when employed in the manner contemplated by this inventon has been increased at least four times over the conventional constructions employed in the field.

Moreover, the flexing of the sealing member by the diaphragm action will cause a "sponge-like" action to the rubber in its brake fluid absorbing characteristics. It has been found that when the rubber is not flexed the rubber will absorb a certain amount of brake fluid. If the absorbed brake fluid is permitted to remain in the rubber without interruption, rotting and destruction of the rubber takes place. The flexing action of the present invention squeezes out the absorbed brake fluid in each operation, thereby causing disturbance to the absorbed brake fluid which will substantially increase the life of the rubber sealing member.

A particular feature of the invention is the versatility of the piston arrangement for employment to conventional cylinders presently on the market without any change or modification whatsoever. In this connection, particular attention is directed to the fact that many wheel cylinders of the type described herein are presently operating on automobiles and periodically require replacement of the elements contemplated by the applicant's invention. It is true that diaphragm arrangements have been employed in cylinders but all such constructions entail the provision of special cylinders not now employed in the field and the constructions disclosed in the prior art could not be adapted to the present cylinders which are of simple construction and are presently disposed on automobiles. It is needless to say, that the proposition of the adaptability of the device of the present invention to the conventional cylinders presently employed without alteration or modification thereof is a very important advancement in the art. This is particularly true since castings for cylinders are not now readily available and after a time the present cylinders in automobiles would necessarily be prematurely scrapped and replaced which would not be necessary when employing the contemplated piston assembly.

In new cylinder manufacturing methods a "no-go" gauge is employed to test the bore of the cylinder to determine whether it may be employed or discarded. At present, a variance of .007 of an inch in the required bore of the cylinder will permit limited effective use of the cylinder with the conventional flexible sealing members of the prior art. With the contemplated piston and flexible sealing member of this invention the bore of the cylinder may have a variance of approximately .025 of an inch and yet be satisfactorily operable. This is very important because many of the old cylinders may be honed out a few thousandths of an inch and may be salvaged and reemployed when using the piston assembly of the present invention. Moreover, in the manufacturing of new cylinders it will no longer be necessary to hold to close tolerances in the bore of the cylinder because the piston assembly of the present invention will effectively operate within the tolerances hereinbefore set forth. This will eliminate elaborate testing operations in the manufacture of new cylinders thus providing a substantial reduction in cost. Moreover, many new cylinders which would have been discarded could be employed thus providing additional savings.

Experiments have also proven the fact that this invention provides a softer action of the brake pedal. This is largely due to the fact that almost all friction has been eliminated by the diaphragm action of the flexible sealing member of the present invention. In prior art practices the scuffing action of the conventional flexible sealing members in their respective cylinders provided substantial friction problems which reflected upon the operation of the brakes. With the piston and flexible sealing member of the present invention the brakes can be readily applied by the force exerted by two fingers while the present conventional brakes require much more pressure and requires at least a foot pressure operation.

Having thus generally described the co-relationship and the cooperative function of the elements of the contemplated piston assembly, the specific structural features of the various elements will now be described in detail.

Adverting to Figs. 1 and 3 wherein the flexible sealing member is illustrated it can be seen that particular attention has been given to the particular design and shape of certain areas for the purpose of providing the cooperative effort of the various elements to perform the functions hereinbefore described through the three phases of operation. Particular attention should be given to the thickness of the convex surface exemplified by the distance P which, in most cases, should be approximately $\frac{1}{16}$ of an inch.

It is notable that the surface 33 defined by the distance R (Fig. 3) preferably is formed to define an arcuate or beveled shape while the remainder of the surface indicated by the numeral 34 is formed to define a protuberance as illustrated. The convex surface 33 actually assists in causing axial movement of the piston because when fluid pressure is exerted upon the face 38 and upon the internal surface 39 of the flexible sealing member and by virtue of the fact that the peripheral edge 37 of the sealing member is in frictional engagement with the internal bore 30 of the cylinder, the flexible member will tend to straighten itself to assume its normal position as shown in Figs. 3 and 4, thereby assisting in causing axial movement of the piston body 31.

Adverting to Figs. 3, 4 and 5 wherein there is illustrated the sealing member as being disposed in its normal upright position when not disposed in the cylinder. It can be seen that when the sealing member is not subjected to the opposed pressures of the spring 26 and the static fluid pressure it will assume its normal position wherein the surface 33 defines an arcuate shape while the protuberance 34 projects outwardly of the sealing member body as illustrated in Figs. 3 and 4. It is the combination of the opposed pressures exerted by the spring 26 and the static fluid pressure coupled with the atmospheric pressure and the pressure exerted by the spring 41 which causes the sealing member to become draped over the flat surface 42 of the piston body 31 to assume its operative position as depicted in Fig. 1.

In Fig. 6 there is depicted a modified form of sealing member. The general construction and cooperative function of the elements thereof are exactly the same as hereinbefore described with respect to the sealing member depicted in Figs. 1 and 3 with the exception that the protuberance 34 is omitted and the surface 50 is formed to define a generally arcuate shape as shown.

In Fig. 7 there is depicted a further modified form of sealing members, the general construction and cooperative function of the elements thereof being exactly the same as hereinbefore described with respect to the sealing member depicted in Figs. 1 and 3 with the exception that the surface 55 which normally confronts the flat surface 42 is formed to define a generally cone-shape.

From the foregoing disclosure, it may be observed that I have provided an improved piston assembly including a flexible sealing member for fluid actuated motors which effectively fulfills the objects thereof as hereinbefore set forth and which provides numerous advantages which may be summarized as follows:

1. Structurally simple, efficient and durable;
2. Economical to manufacture and readily adaptable to mass production manufacturing principles;
3. Adaptable to replacement of conventional prior art piston assemblies without alteration or modification of cylinders; and
4. The provision of an improved flexible sealing member which will prolong the life and term of operation thereof and will increase the efficiency of operation of the fluid actuated motor.

While I have illustrated preferred embodiments of my invention, many modifications may be made without departing from the spirit of the invention, and I do not wish to be limited to the precise details of construction set forth, but wish to avail myself of all changes within the scope of the appended claims.

I claim:

1. For a fluid actuated motor unit including means defining a cylinder, means defining a relatively non-flexible piston-like member reciprocable in said cylinder, and means defining a flexible generally cup-shaped member operatively associated with the piston-like member and disposed in said cylinder so that at least one surface of each of said members will be in confronting relationship, the confronting surface of said flexible member defining a generally convex shape, the periphery of said flexible member defining an axially extending surface normally complementary to the internal bore of said cylinder, said motor unit having means arranged to exert an increasing and decreasing degree of fluid pressure upon the flexible member and the piston-like member and means arranged to exert a mechanical pressure upon the piston-like member in the opposite direction, said piston-like member and said flexible member being arranged for coaction in a first phase of operation wherein the coaction of said convex surface of one of the members upon the confronting surface of the other member and of said pressures exerted in opposed direction upon the piston-like member and the flexible member will cause the axially extending surface of said flexible member to move radially outwardly to thus produce a seal and locked relation with the bore of the cylinder followed by a second phase of operation wherein a diaphragm action is imparted by the central portions of said flexible member, the flexible member being arranged so that any increase in fluid pressure disposed upon the flexible member and the piston-like member greater than the mechanical pressure disposed upon the piston-like member will be reflected upon the central portions of the flexible member, thereby to overcome the force of the mechanical pressure exerted upon the piston-like member and move the piston axially in the cylinder a normal predetermined distance to perform work while the axially extending surface of the flexible member is in the seal and locked relation, the second phase of operation being followed by a third phase of operation wherein the flexible member and the piston-like member are arranged to coact to readjustment when the piston is caused to move axially beyond the normal predetermined distance, whereupon the flexible member will be caused to unlock itself and follow the axial movement of the piston-like member to assume a new position whereupon the seal and locked relationship and the diaphragm action is repeated.

2. For a fluid actuated motor having a hydralic cylinder having a piston movably disposed in the cylinder, a flexible member having a surface arranged to be in confronting relation with a surface of the piston, the surface of the flexible member confronting the piston defining a general convex portion and a coaxial protuberance and the surface of the piston confronting the flexible member normally defining a substantially flat surface, said motor having means arranged to exert a predetermined fluid pressure upon the flexible member and having means arranged to exert a mechanical pressure upon the piston in the opposite direction, the piston and flexible member being arranged so that the coaction of the convex portion and the coaxial protuberance of the flexible member upon the flat surface of the piston and of said pressures exerted in opposed direction upon the piston and the flexible member will cause the peripheral edges of the flexible member to sealingly engage the cylinder wall to lock the flexible member in operative position, said flexible member being arranged so that any increase in fluid pressure disposed upon the flexible member greater than the mechanical pressure disposed upon the piston will be reflected upon portions of the flexible member to cause a diaphragm action to the flexible member, thereby to overcome the force of the mechanical pressure means and move the piston axially in the cylinder a normal predetermined distance to perform work.

References Cited in the file of this patent

UNITED STATES PATENTS

| Number | Name | Date |
|---|---|---|
| 2,059,444 | Dick | Nov. 3, 1936 |
| 2,196,995 | LaBrie | Apr. 16, 1940 |
| 2,371,554 | Iversen | Mar. 13, 1945 |